Dec. 31, 1968    I. L. W. GLONINGER ET AL    3,418,717
MEASURING APPARATUS
Filed Nov. 15, 1966
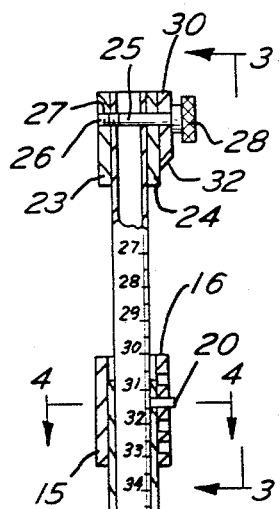
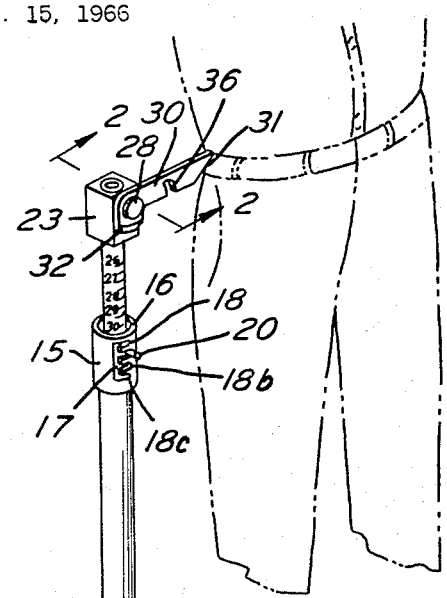
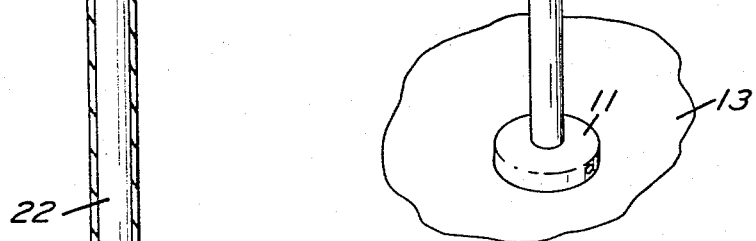
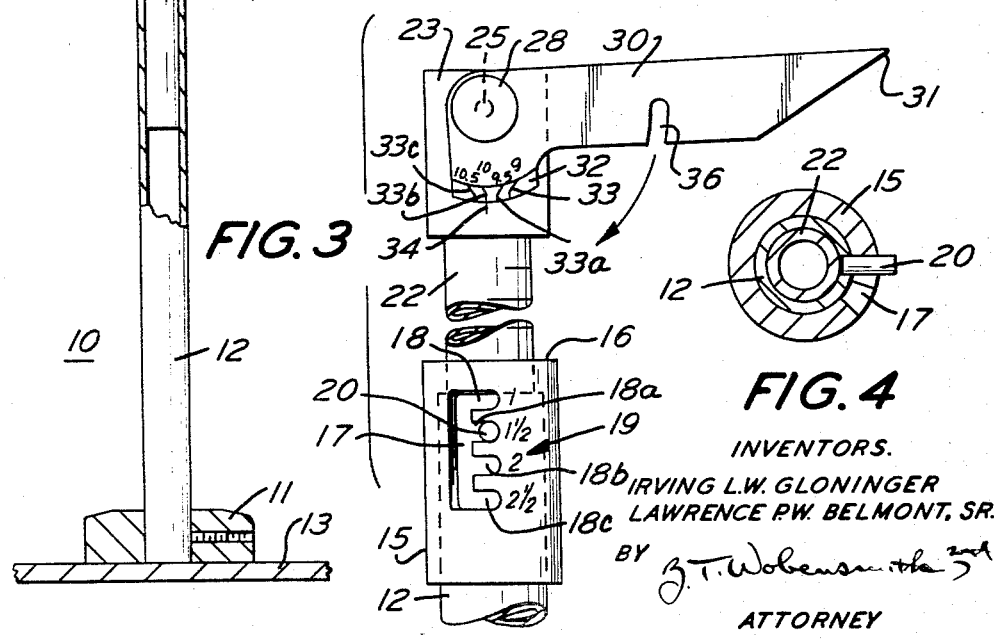
INVENTORS.
IRVING L.W. GLONINGER
LAWRENCE P.W. BELMONT, SR.
BY B.T. Wobensmith 2nd
ATTORNEY

United States Patent Office 3,418,717
Patented Dec. 31, 1968

3,418,717
MEASURING APPARATUS
Irving L. W. Gloninger, Bala Cynwyd, and Lawrence P. W. Belmont, Sr., Philadelphia, Pa. (both c/o Irving L. Wilson Company, 1 Highland Ave., Bala Cynwyd, Pa. 19004)
Filed Nov. 15, 1966, Ser. No. 594,509
6 Claims. (Cl. 33—8)

ABSTRACT OF THE DISCLOSURE

Apparatus is disclosed for determining the inseam and outseam measurements of trousers. A stand is provided having a telescoped post and a collar for accommodating the device to a desired distance from the floor to the lower margin of the trousers. The post has a head with a gage arm adjustably mounted for setting to a selected crotch to upper margin of the trousers dimension. By proper setting of the device, measurement of the compensated height of the outseam is all that is required in connection with the proper fitting of trousers to determine the inseam measurement.

This invention relates to measuring apparatus and more particularly to apparatus for use in connection with the determination of the inseam and outseam measurements of trousers.

Such measurements are required so that the trousers, particularly if ready made, can have their cuffs positioned the proper distance from the floor in use.

Such measurements are also useful in connection with the issuance of uniforms from stock sizes.

It is the common practice in connection with the sale of ready made trousers, whether sold separately or as part of a suit, to measure the desired length of inseam downwardly from the crotch so that the lower edge of the trouser legs may then be located to suit the purchaser. This location may be such that the trousers "break" slightly on the shoe, touch the shoe, or expose a portion of the sock. The taking of such measurements requires stooping on the part of the person taking the measurement and is not usually relished by the purchaser.

Trousers of the ready made type have different predetermined distances from the crotch to the upper margin of the trousers, dependent upon whether they are "short," "regular," "long," or "extra long."

No wholly satisfactory apparatus for making the measurements referred to has received acceptance in the clothing field.

It is the principal object of the present invention to provide measuring apparatus which is particularly suited for determining the desired length of inseam of trousers and in which the measurement is made at a different location from the inseam.

It is a further object of the present invention to provide measuring apparatus of the character aforesaid in which an adjustment may be made to accommodate the inseam length in accordance with the desired location of the lower margin of the trouser leg with respect to the floor.

It is a further object of the present invention to provide measuring apparatus of the character aforesaid in which an adjustment may be made to accommodate standard types of ready made trousers having predetermined distances from the crotch to the upper margin of the trousers.

It is a further object of the present invention to provide measuring apparatus of the character aforesaid which is easy to use and which greatly facilitates the determination of the desired inseam length.

Other objects and advantageous features of the invention will be apparent from the description and claims.

The nature and characteristic features of the invention will be more readily understood from the following description, taken in connection with the accompanying drawings forming part thereof, in which:

FIGURE 1 is a view in perspective illustrative of the manner of using the measuring apparatus of the present invention;

FIG. 2 is a vertical central sectional view of the apparatus of the present invention;

FIG. 3 is a fragmentary sectional view, enlarged, taken approximately on the line 3—3 of FIG. 2; and FIG. 4 is fragmentary sectional view, enlarged, taken approximately on the line 4—4 of FIG. 2.

It should, of course, be understood that the description and drawings herein are illustrative merely, and that various modifications and changes can be made in the structure disclosed without departing from the spirit of the invention.

The apparatus in accordance with the invention preferably includes a stand with a collar adjustable to a predetermined position corresponding to the desired distance from the floor of the lower margin of the trouser leg. The stand has a telescoped post with a head on which a gage arm is mounted adjustable to a particular size of trousers having a predetermined distance from the crotch to the upper margin of the trousers.

Referring now more particularly to the drawings, in which a preferred embodiment of the invention is illustrated, a stand 10 is provided which has a base 11 and a tubular upright 12. The base 11 may, if desired, be weighted but is preferably secured to the top of a platform 13 which is elevated above the floor about one foot and upon which the person to be measured stands while the measurement is being made.

At the upper end of the tubular upright 12, a cylindrical collar 15 is provided having an upper edge face 16, a vertical slot 17, and a plurality of horizontal slots 18, 18a, 18b, and 18c, communicating with the slot 17. The slots 18, 18a, 18b and 18c are at elevations corresponding to the desired selected location of the lower margin of the trouser leg with respect to the floor in use. The slots 18, 18a, 18b and 18c correspond respectively to desired locations of one inch, one and one half inches, two inches, and two and one half inches from the floor and suitable identifying indicia 19 is preferably provided for these slots. Other locations could be provided if desired.

The tubular upright 12 has a retaining pin 20 so that the desired slot 18, 18a, 18b or 18c can be employed in engagement therewith to determine the positioning of the collar 15 as selected by the user.

A post 22 is provided in telescoped relation to the upright 12, and preferably in frictional engagement therein.

The post 22 has a head 23 secured thereto with a lower face 24 which is adapted to abut the edge face 16 in collapsed position.

The head 23 has a pivot pin 25 with a threaded end 26 engaged in a complemental internally threaded portion 27 for tightening, and the pivot pin 25 has a knurled knob 28 for manual adjustment.

A gage arm 30, pivotally carried on the pivot pin 25, has an outer or free end 31 and has a sector 32 with gage marks 33, 33a, 33b and 33c which can be selectively positioned as desired with respect to a gage mark 34 on the head 23. The gage marks 33, 33a, 33b and 33c correspond to predetermined distances from the crotch to the upper margin in ready made trousers, these being shown respectively as nine inches, nine and one half inches, ten inches, and ten and one half inches, and corresponding to trousers known as "short," "regular," "long," and "extra long."

The post 22 is provided with indicia 35, shown as inches of inseam length correlated with the upper edge face 16 for direct reading on the post 22 of the inseam measurement as hereinafter explained.

The gage arm 30 is preferably provided with a slot 36 which can engage with the pin 20 when the collar 15 is positioned with the slot 18a on the pin 20, with the face 24 in engagement with the face 16, and with the gage arm 30 turned downwardly. The apparatus can be stored in this condition.

The mode of use will now be pointed out.

The person to be measured stands on the platform 13 and the user adjusts the gage arm 30 in accordance with the particular type of trousers, so that the appropriate gage mark 33, 33a, 33b or 33c is aligned with the gage mark 34.

The collar 15 is positioned in accordance with the distance from the floor at which the lower marginal edge of the legs of the trousers is desired. The head 23 is then manually positioned by the user so that the gage arm end 31 is at the location at which the trousers are supported, this normally being just on the hip bone.

The inseam measurement will then be shown by the post indicia 35 at the upper edge surface 16.

It will thus be seen that simple but effective apparatus is provided for giving a direct reading of the proper inseam measurement without the necessity for access to the crotch of the person to be measured.

This measurement can be utilized for sewing the cuffs or bottoms of the trousers at the desired location and can also be used for selecting trousers of fixed and predetermined inseam length, such as military and other uniforms where selection can be made from stock on hand.

We claim:
1. Measuring apparatus for determining the inseam measurement of trousers comprising
   a stand having an upright portion,
   a member adjustably carried by said stand and having a measuring portion,
   a post in telescoped relation to said upright portion, and
   a head on said post having a gage arm with a free end for location at the support location of the trousers on the body,
   said post having inseam dimensional indicia for reading with respect to said measuring portion,
   said gage arm being provided with a mounting means for positioning said free end at the desired elevation with respect to said head as determined by the crotch to upper margin dimension of the trousers.
2. Measuring apparatus as defined in claim 1 in which said mounting means includes indicia corresponding to different crotch to upper margin trouser dimensions.
3. Measuring apparatus as defined in claim 1 in which said mounting means includes a pivotal mounting for said gage arm.
4. Measuring apparatus as defined in claim 3 in which said gage arm is movable downwardly and has a portion for holding engagement with a portion carried by said stand.
5. Measuring apparatus as defined in claim 1 in which said upright portion has a collar adjustably carried thereon,
   said collar has a plurality of slots at selected levels corresponding to the desired termination of the inseam with respect to the floor,
   said upright has a retaining pin for engagement by said collar at a selected one of said slots, and
   said gage arm includes pivotal mounting means for positioning said free end at the desired elevation with respect to said head as determined by the crotch to upper margin dimension of the trousers.
6. Measuring apparatus as defined in claim 5 in which said gage arm is movable downwardly and has a slot for holding engagement with said retaining pin.

References Cited
UNITED STATES PATENTS

| | | | |
|---|---|---|---|
| 2,178,658 | 11/1939 | Turpan | 33—8 |
| 2,182,953 | 12/1939 | Turpan | 33—8 |
| 2,734,270 | 2/1956 | Finnegan | 33—8 |

SAMUEL S. MATTHEWS, *Primary Examiner.*